United States Patent Office 3,197,466
Patented July 27, 1965

3,197,466
PENICILLIN SULFOXIDES AND PROCESS
Alfred W. Chow, Merchantville, N.J., and John R. E. Hoover, Glenside, Pa., assignors to Smith Kline & French Laboratories, Philadelphia, Pa., a corporation of Pennsylvania
No Drawing. Filed Oct. 30, 1961, Ser. No. 148,711
6 Claims. (Cl. 260—239.1)

This invention relates to novel antimicrobial derivatives and more specifically pertains to oxygenated derivatives of penicillins and to processes for their preparation.

In particular the compounds of this invention are sulfoxides and sulfones of penicillins and may be represented by the following structural formula:

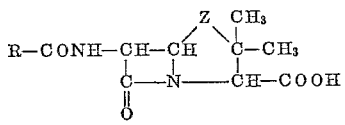

wherein Z is

or

and R is alkyl, phenylalkyl, phenoxyalkyl or phenyl, including the closely related substituted phenyl analogs thereof.

The compounds of the present invention are antibacterial agents, exerting their activity against those micro-organisms generally susceptible to penicillins. They are accordingly useful in the treatment of infections caused by such micro-organisms and may be administered in any of the usual pharmaceutical forms. In particular these compounds demonstrate improved acid resistance and are therefore especially well suited for oral administration. With conventional penicillins degradation by acid has been a serious drawback when administered orally.

While the above compounds are represented as the free acids, it is apparent that pharmaceutically acceptable non-toxic salts thereof may similarly be employed. These salts include for example, the alkali metal salts such as sodium, potassium and calcium and the organic amine salts such as procaine, triethylamine, benzanthine, N-ethyl piperidine, and the like.

The penicillin sulfones and penicillin sulfoxides of the present invention are prepared by treating the corresponding penicillin with an oxidizing agent. To prevent degradation of the nucleus, it is generally desirable, in this oxidation step, to employ an ester of the particular penicillin. A particularly useful derivative in this respect is the benzyl ester which may be easily converted to the free acids by catalytic hydrogenation. A suitable process for the preparation of these esters embraces the treatment of a salt of the penicillin with benzyl bromide. This process is described in copending application Serial No. 148,740 filed October 30, 1961.

These reactions may be represented as follows:

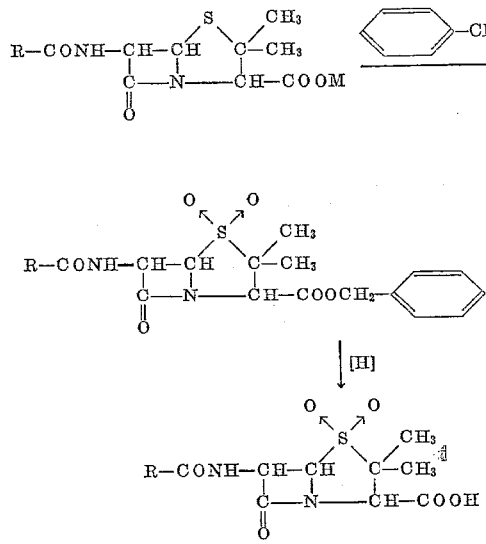
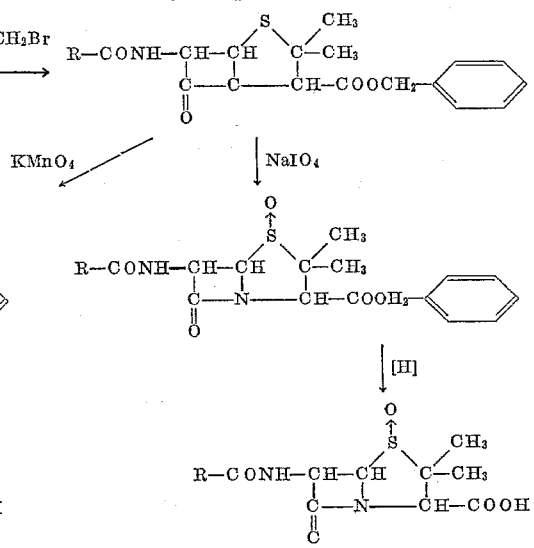

wherein R is lower alkyl from 1 to 8 carbon atoms, phenylalkyl, phenoxyalkyl or phenyl, including the closely related substituted phenyl analogs thereof.

To prepare the sulfones of this invention, an oxidizing agent such as a dilute aqueous potassium permanganate solution is employed. When Z is the sulfoxide group, a weaker oxidizing agent such as a dilute aqueous sodium iodate solution is generally employed. The products so formed are valuable intermediates and are isolated by standard extraction methods which are more fully exemplified hereafter.

The particular penicillin sulfoxide or sulfone so prepared by the above oxidation step is obtained in the form of its benzyl ester and is converted to its free acid by catalytic hydrogenation. Suitable catalysts for this hydrogenation include palladium-on-carbon, palladium-on-barium sulfate, platinum oxide and the like.

The above procedures are applicable to any penicillin, whether prepared by fermentation or synthetically from 6-aminopenicillanic acid, provided no groups are present in the molecule which are sensitive to the oxidative conditions employed. Suitable penicillins include for example benzylpenicillin (penicillin G), phenoxymethylpenicillin (penicillin V), dihydro penicillin F, penicillin K, phenethicillin, 2,6-dimethoxyphenylpenicillin and the like.

The following examples will serve to further typify this invention; these examples, however, are presented for exemplication and not limitation.

Example 1

To a stirred solution of 9.1 g. (0.0214 mole) of benzylpenicillin benzyl ester in 860 ml. of dioxane and 515 ml. of phosphate buffer (6.8 pH) is added 310 ml. of a 0.25 molar sodium periodate solution. The resulting mixture is stirred for one hour and concentrated to 300 ml. by evaporation in vacuo at low temperature. The oil which separates is extracted with chloroform and these chloroform extracts are dried over sodium sulfate and concentrated to an oil. Addition of ether causes solidification of the product, benzylpenicillin sulfoxide benzyl ester, which is further purified by recrystallization from ethyl acetate-petroleum ether.

The benzylpenicillin benzyl ester employed above may be advantageously prepared according to the following procedure. A suspension of 111.6 g. (0.3 mole) of potassium benzyl penicillinate in 500 ml. of freshly distilled benzyl bromide is stirred at room temperature for 90 minutes. The mixture is then filtered and the filtrate poured into 1.5 l. of ice water. The resulting oil is extracted with ether, washed with aqueous sodium bicarbonate and dried over anhydrous sodium sulfate. The dried solution is next poured into excess petroleum ether and the oil which separates taken up in ether and then dried over sodium sulfate. Evaporation of the ether filtrate in vacuo yields the benzylpenicillin benzyl ester as a syrup. This product is suitable for use without further purification in the above oxidation procedure.

*Example 2*

Phenoxymethylpenicillin benzyl ester (4.7 g.) is substituted for benzylpenicillin benzyl ester in the procedure of Example 1. The mixture is stirred with sodium periodate in the dioxane-phosphate buffer for four hours at room temperature. Additional sodium periodate, dioxane and phosphate buffer are added and the mixture stirred for 96 hours. A fresh reagent is then added and the mixture then stirred for 48 hours at 50° C. The reaction mixture is then processed according to the procedure of Example 1 to yield phenoxymethylpenicillin sulfoxide benzyl ester.

The requisite phenoxymethylpenicillin benzyl ester may be prepared from the sodium salt of phenoxymethylpenicillin and benzyl bromide according to the esterification procedure described in Example 1.

*Example 3*

Following the procedure described in Example 1 the following compounds are substituted for benzylpenicillin benzyl ester: dihydropenicillin F, penicillin K, phenethicillin, and 2,6-dimethoxyphenylpenicillin. There are thus obtained after esterification the corresponding sulfoxides as their benzyl esters.

*Example 4*

Twenty-six grams of benzylpenicillin benzyl ester are dissolved in 400 ml. of 80% acetic acid. To this solution is added over a 30 minute period 21 g. of potassium permanganate in 200 ml. of water. After one hour there is added sufficient 30% hydrogen peroxide solution to discharge the color. Upon addition of 1 l. of water an oily precipitate separates which is taken up in 80% acetic acid and reprecipitated by the addition of three volumes of water. The supernatant liquid is decanted and the gummy precipitate dissolved in benzene and evaporated to dryness in vacuo. This product is again dissolved in benzene and evaporated to yield benzylpenicillin sulfone benzyl ester.

*Example 5*

Phenoxymethylpenicillin benzyl ester (12.5 g.) is substituted for benzylpenicillin benzyl ester in the procedure of Example 4. The gummy product so obtained is dissolved in chloroform, washed twice with 5% sodium bicarbonate solution and twice with water, and the chloroform sodium sulfate. Removal of the drying agent by filtration and the solvent by evaporation yields the product phenoxymethylpenicillin sulfone benzyl ester which is recrystallized from benzyl-petroleum ether.

In a similar manner dihydropenicillin F, penicillin K, phenethicillin and 2,6-dimethoxyphenyl penicillin, all as their respective benzyl esters are subjected to the above procedure to yield the corresponding penicillin sulfones as the benzyl esters.

*Example 6*

The penicillin sulfones and sulfoxides obtained above are in the form of their benzyl esters and are converted to the free acids by the following procedure.

A solution of 6.85 g. (0.015 mole) of benzylpenicillin sulfone benzyl ester in 200 ml. of methanol is hydrogenated at 500 p.s.i. in the presence of 5.5 g. of 10% palladium-in-carbon which has been prehydrogenated for 15 minutes. The hydrogenation is continued until hydrogen uptake is complete (about 30 minutes). The mixture is filtered and concentrated to yield the crude benzylpenicillin sulfone. This product is extracted with N-butyl acetate and the extracts concentrated to a solid which is further purified by successive recrystallizations from ethyl acetate-petroleum ether.

Similarly, benzyl esters of the following sulfones are subjected to the above procedure to yield the corresponding free acids. Phenoxymethylpenicillin sulfone benzyl ester, dihydropenicillin F sulfone benzyl ester, penicillin K sulfone benzyl ester, phenethicillin sulfone benzyl ester and 2,6-dimethoxyphenylpenicillin sulfone benzyl ester.

The sulfoxides of the above penicillin benzyl esters are reduced by a similar process of which the following is representative. Benzylpenicillin sulfoxide benzyl ester (1.76 g.) is hydrogenated at atmospheric pressure with 2.6 g. of pre-reduced 10% palladium-on-charcoal employing dry ethyl acetate as the solvent. Hydrogen uptake is completed in 30 minutes and the catalyst then removed by filtration. Evaporation of the filtrate in vacuo yields the product benzylpenicillin sulfoxide which is recrystalized from ethyl acetate-petroleum ether. Similarly, phenoxymethylphenicillin sulfoxide, dihydropenicillin F sulfoxide, penicillin K sulfoxide, phenethicillin sulfoxide and 2,6-dimethoxyphenylpenicillin sulfoxide are obtained by reduction of the corresponding benzyl esters.

We claim:

1. A compound of the structure:

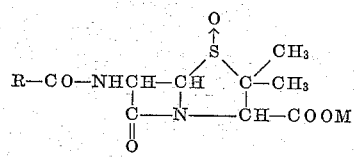

wherein

R is a member selected from the group consisting of lower alkyl, phenyl lower alkyl, phenoxy lower alkyl, and phenyl; and M is a pharmaceutically acceptable nontoxic cation selected from the group consisting of hydrogen, alkali metal cations and organic amine cations.

2. A compound of the structure:

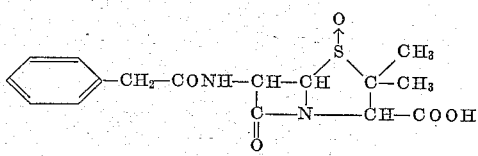

3. A compound of the structure:

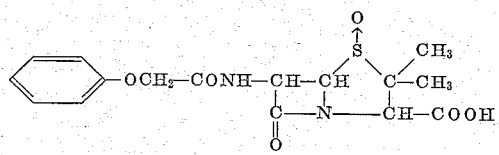

4. The benzyl ester of benzylpenicillin sulfoxide.

5. The benzyl ester of phenoxymethylpenicillin sulfoxide.

6. In the process for the preparation of compounds of the structure:

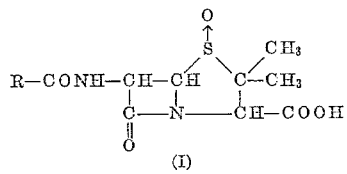

(I)

wherein R is a member selected from the group consisting of lower alkyl, phenyl lower alkyl, phenoxy lower alkyl, and phenyl, the steps which comprise treating a penicillin of the structure:

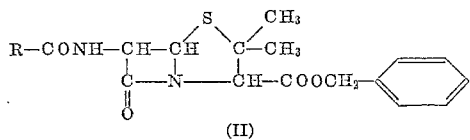

(II)

with an aqueous solution of sodium iodate so as to form a penicillin sulfoxide of the structure:

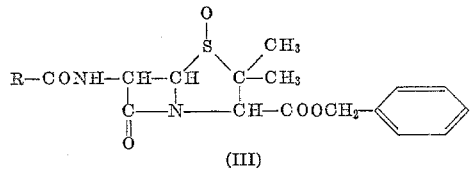

(III)

and thereafter catalytically hydrogenating (III) so as to form the corresponding free acid (I).

References Cited by the Examiner

UNITED STATES PATENTS

| | | | |
|---|---|---|---|
| 2,338,516 | 1/44 | Kern | 260—239.1 |
| 2,483,235 | 9/49 | Rogers et al. | 260—239.1 |
| 2,934,540 | 4/60 | Sheehan | 260—239.1 |
| 2,941,995 | 6/60 | Doyle et al. | 260—239.1 |

FOREIGN PATENTS 470,733   1/51   Canada.

NICHOLAS S. RIZZO, *Primary Examiner.*

Disclaimer 3,197,466.—*Alfred W. Chow,* Merchantville, N.J., and John R. E. Hoover, Glenside, Pa. PENICILLIN SULFOXIDES AND PROCESS. Patent dated July 27, 1965. Disclaimer filed Mar. 18, 1968, by the assignee, *Smith Kline & French Laboratories.*

Hereby enters this disclaimer to claim 4 of said patent.
[*Official Gazette July 2, 1968.*]

Disclaimer 3,197,466.—*Alfred W. Chow*, Merchantville, N.J., and *John R. E. Hoover*, Glenside, Pa. PENICILLIN SULFOXIDES AND PROCESS. Patent dated July 27, 1965. Disclaimer filed July 3, 1972, by the assignee, *Smith Kline & French Laboratories*.

Hereby disclaims the entire terminal part of said patent.

[*Official Gazette August 29, 1972.*]